United States Patent Office 3,293,859
Patented Dec. 27, 1966

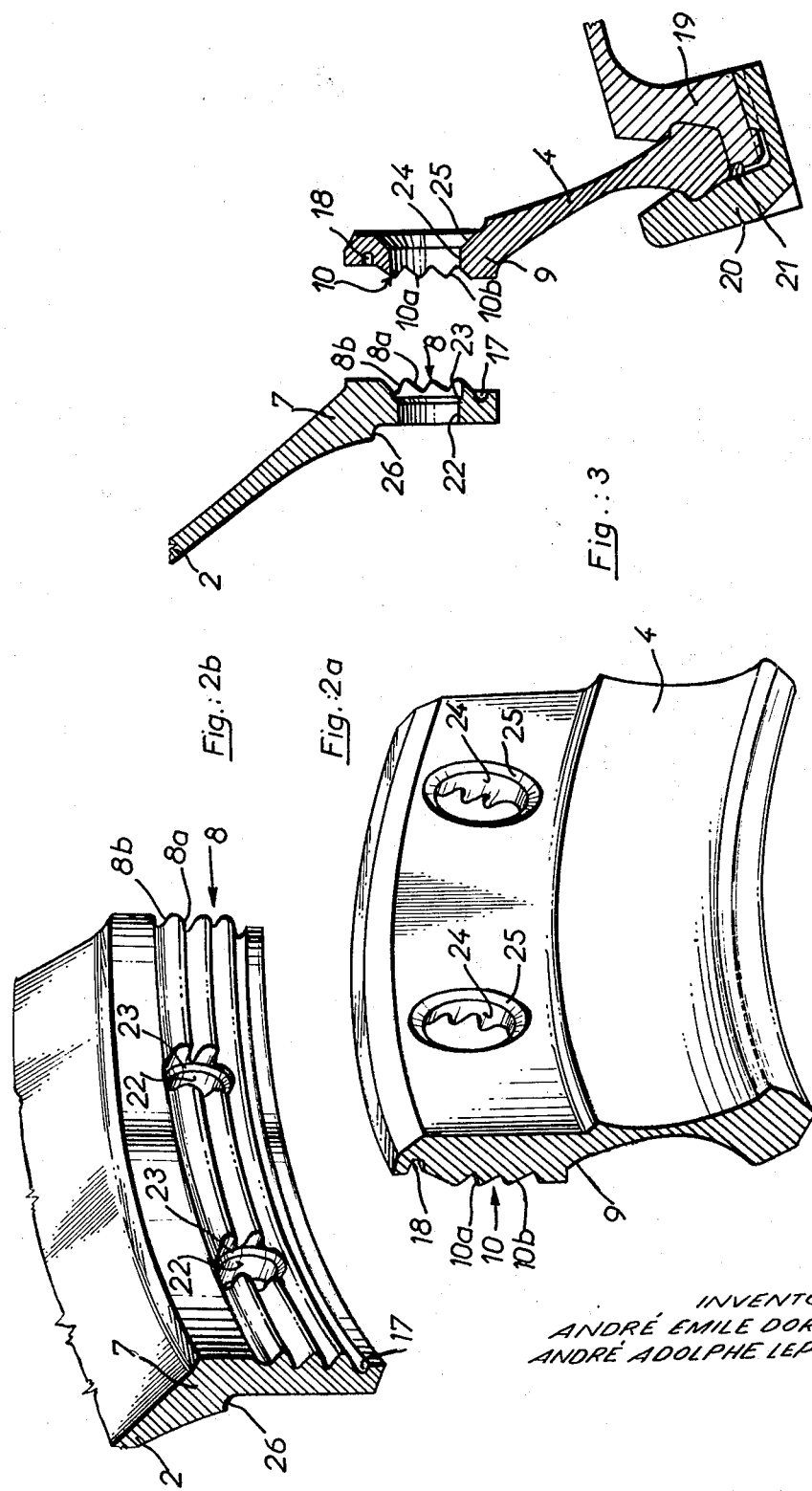

3,293,859
MEANS FOR SECURING AN END-PORTION OF A CONTAINER UNDER PRESSURE, IN PARTICULAR OF A ROCKET BODY
André Emile Dorangeon, Dammarie-les-Lys, and André Adolphe Leprince, Paris, France, assignors to Societe Nationale d'Etude et de Construction de Moteurs d'Aviation, Paris, France, a company of France
Filed Mar. 29, 1963, Ser. No. 268,958
Claims priority, application France, Apr. 4, 1962, 893,306
7 Claims. (Cl. 60—263)

This invention relates to improved means or securing an end-portion of a container under pressure. The invention is particularly, but not exclusively, applicable to the securing of the end-portion of a rocket body.

The body of a rocket is generally constituted by a substantially cylindrical casing or sleeve and by end portions, the tight connection of which to the said casing presents a major constructional problem. Increase in performance, in fact, involves increase in the strains imposed on the component parts of a rocket body and the conventional connecting devices become inadequate. There is the risk of their becoming deformed or even giving way accidentally and these risks are increased when the combustion temperature of a powder-type (solid fuel) rocket is very high or when an end portion supports a plurality of nozzles, which may possibly be adjustable in direction.

The present invention has for its object to reduce the risk of accidents occurring by providing an improved connecting device which is adapted to transmit both substantial shearing stresses and substantial bending moments.

The invention is particularly applicable to end portions formed from two parts, namely, an annular part fixed to the sleeve and a central part carrying the nozzle or nozzles.

The invention consists essentially in providing the respective edges of the sleeve and the end portion with mating bearing surfaces having grooves coaxial with the end portion, these surfaces being applied one against the other by a large number of bolts or like fixing elements distributed along the said edges. These bolts or the like are thus subjected solely to tensile stresses.

In one advantageous form of construction embodying the invention, the coaxial grooves have an asymmetrical profile, enabling the tensile stresses applied to the wall of the two parts of the end portion and to the fixing elements to be transmitted to the best advantage, the fixing elements having their axis parallel to that of the rocket and being provided with a step enabling them to be fixed to that part of the end portion which is fast with the sleeve, thus facilitating the fitting thereof.

The description which follows with reference to the accompanying drawings is given by way of nonlimitative example only but will make the various features of the invention and the manner of carrying them into effect clearly understandable, any arrangement appearing both from the text and from the figures coming, of course, within the scope of the present invention.

FIGURE 2a is a fragmentary perspective view of the nozzle-supporting part at the rear of the rocket;

FIGURE 2b is a corresponding view of the rear end of the body of the rocket;

FIGURE 3 is an exploded detail view showing, on a larger scale, the flange for coupling the end portion of the rocket.

Figure 1:
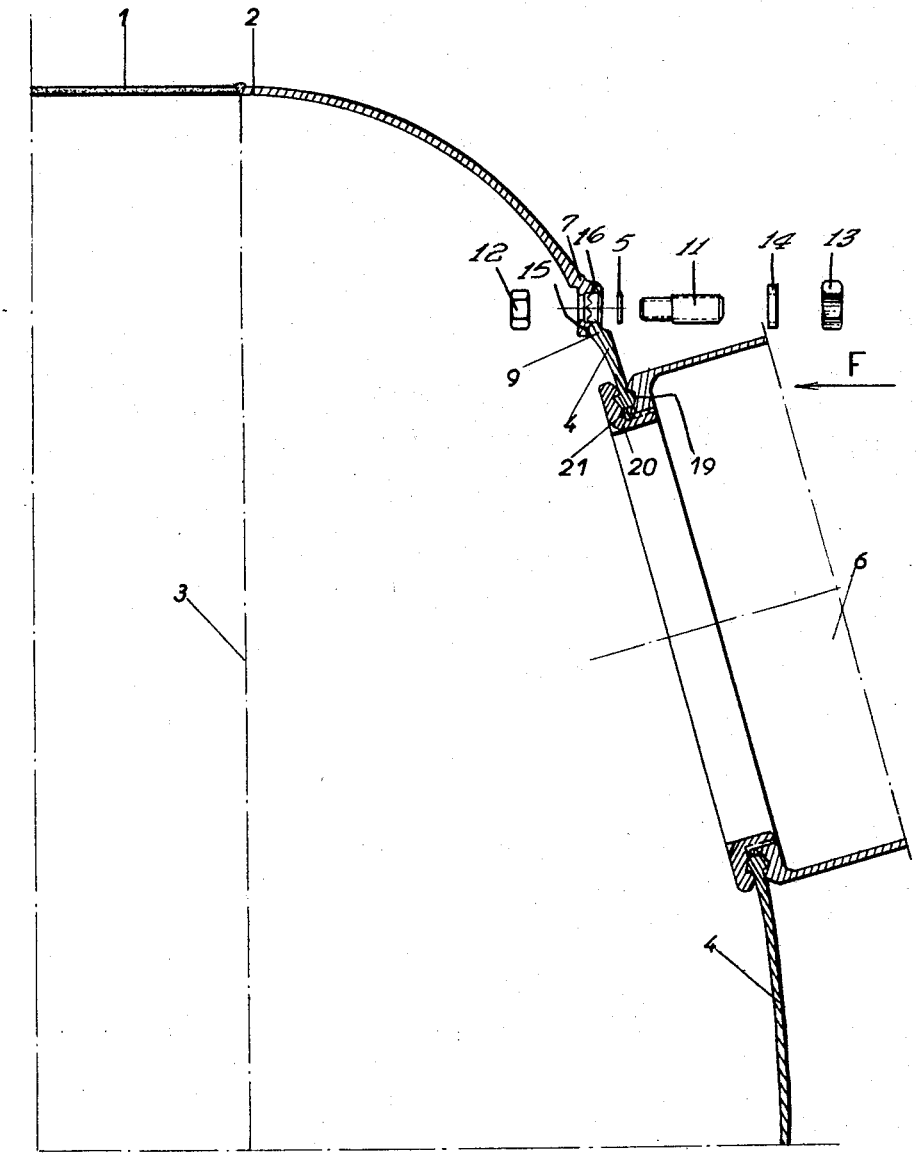
FIGURE 1 is a diagrammatic sectional view through one half of the rear portion of a rocket taken on a radial plane of the rocket and showing a coupling bolt which forms part of the rocket in exploded form.

Referring to the figures, there is shown at the rear of a rocket, the body of which is constituted by a sleeve 1 and by an end portion having an annular peripheral part 2 which is welded to the rear edge 3 of the sleeve 1. The part 2 of the end portion is in the form of a ring and it is fixed to the central portion 4 by means of a flange constructed in accordance with the invention; the portion 4 supports the nozzles 6 of the rocket which may be, for example, four in number.

The annular part 2 terminates in a thickened portion 7 in which are machined grooves or indentations 8, which are surfaces of revolution about the axis of symmetry of the rocket.

Likewise, the central part 4 terminates in a thickened portion 9 having mating or complementary grooves or indentations 10, likewise coaxial with the rocket.

The method of fixing is shown in FIGURE 1. The two flanges 7 and 9 have a large number of holes 22 or 24 formed in them to extend parallel to the axis of the rocket, the holes being formed at the same radial position as the grooves or indentations 8 and 10. Each hole 22 drilled in the flange 7 has a step or shoulder 23, against which bears a shoulder of the corresponding threaded fixing element 11, and a boss 26 which prevents the nut 12 from turning. Each hole 24 drilled in the flange 9 has a chamfered edge or shoulder 25 adapted to receive a toroidal sealing ring 5 which is clamped in position by a nut through the intermediary of a bearing washer 14.

The mating grooves or indentations 8 and 10 have asymmetrical triangular profiles. Any sliding which might be caused by the overpressure prevailing in the body of the rocket would take place tangentially relatively to the wall and would tend to separate the two parts of the end portion. In order to counteract this tendency, the outer faces 8b of the grooves in the flange 7 are steeply inclined with respect to the direction of sliding and are thus only slightly inclined with respect to the axis, as compared with the inner faces 8a of the same notches. Correspondingly, the inner faces 10b of the grooves on the flange 9 are less inclined with respect to the axis than the outer faces 10a.

Consequently, co-operation between the faces 8b, 10b and 8a, 10a provides positive fixing and the threaded clamping elements 11 are subjected exclusively to tensile stresses.

Tightness to the gases contained in the body of the rocket is obtained by means of the above-mentioned seal 5 and by means of two toroidal seals 15, 16 housed in grooves 17, 18 formed in the flanges 7 and 9, respectively. The nozzles 6 are fixed to the centre part 4, preferably by means of the screw-threaded engagement of the flanges 19 of each nozzle 6 with an independent collar 20, the flange 19 and collar 20 imprisoning between them a thickened portion of the said end portion and a sealing ring 21 being interposed between the flange 19 and collar 20.

Assembly is effected as follows. The nuts, such as 12, are placed in position and each nut is held against rotation by the boss 26 during the screwing-in of the fixing element 11, the shoulder of the latter abutting against the step 23 of the hole 22. The assembly can be clamped to the end portion 2 proper by means of the nuts 13 and the associated washers 14, after the sealing rings 5 have been interposed.

Among the advantages of the connection device provided by the invention there will be noted first the indeformability of the end portion which is obtained in this way, which may increase the precision of any guiding device which may be provided. There will also be noted the advantages of accessibility, which assists dismantling operations, increased tightness and, finally, reduction of the over-all dimensions and weight with which there goes hand in hand, better distribution of the loads.

It is obvious that the invention is not limited to the particular embodiment described, but that it also covers modifications which can be obtained by the use of equivalent technical means.

What is claimed is:

1. In a vessel-like pressure-resisting structure including a casing, an end portion fast therewith and a removable central portion adaptable to said end portion, said portions having a common longitudinal axis, fastening means securing said portions to each other, said fastening means comprising mating surfaces formed on the respective portions generally perpendicular to and coaxial with said axis, said surfaces being integral respectively with said portions and having formed therethrough a plurality of arcuately spaced, relatively registering holes generally parallel to said axis, and bolt means extending through said holes for clamping together said mating surfaces and opposing separation thereof in a direction parallel to said axis, mating indentations being formed on said mating surfaces along closed curves coaxial with each other and with said axis and having mating radially outwardly facing inclined faces and mating radially inwardly facing inclined faces.

2. Structure as claimed in claim 1, wherein said mating indentations are of generally saw-tooth cross section in planes common to said axis.

3. Structure as claimed in claim 2, wherein said mating outwardly facing faces of the indentations of one of said surfaces are more inclined with respect to said axis than said mating inwardly facing faces thereof, and conversely in the case of the indentations of the other of said surfaces.

4. Structure as claimed in claim 1, comprising further a toroidal seal of deformable material housed in a groove formed on at least one of said mating surfaces and extending around said axis.

5. Structure as claimed in claim 1, wherein said bolt means comprise a threaded rod having two stepped sections of different diameters: a section of smaller diameter engaged through the surface integral with said casing portion and a section of larger diameter engaged through the surface integral with said end portion, an inner nut of smaller diameter screwed on said smaller diameter section, and an outer nut of larger diameter screwed on said larger diameter section.

6. Structure as claimed in claim 5, comprising further a boss formed on the inside of said casing portion in the vicinity of said holes, to engage the respective inner nut whereby rotation of the latter is precluded.

7. Structure as claimed in claim 2, wherein said casing portion is a rocket envelope and said end portion is the nozzle-carrying rear end of a rocket.

References Cited by the Examiner

UNITED STATES PATENTS

| | | | |
|---|---|---|---|
| 620,688 | 3/1899 | Wood | 297—373 |
| 3,014,741 | 12/1961 | McDowell | 285—330 |
| 3,154,041 | 10/1964 | McKinnon | 60—35.6 X |
| 3,175,497 | 3/1965 | Head | 60—35.6 X |

FOREIGN PATENTS 14,586   10/1934   Australia.

CARLTON R. CROYLE, *Primary Examiner.*